US009862316B2

United States Patent
Heckel et al.

(10) Patent No.: US 9,862,316 B2
(45) Date of Patent: Jan. 9, 2018

(54) METHOD AND DEVICE FOR VISUALIZING THE SURROUNDINGS OF A VEHICLE

(71) Applicants: Joerg Heckel, Rutesheim (DE); Claus Marberger, Weil der Stadt (DE); Holger Mielenz, Ostfildern (DE)

(72) Inventors: Joerg Heckel, Rutesheim (DE); Claus Marberger, Weil der Stadt (DE); Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 14/371,827

(22) PCT Filed: Nov. 28, 2012

(86) PCT No.: PCT/EP2012/073835
§ 371 (c)(1),
(2) Date: Jul. 11, 2014

(87) PCT Pub. No.: WO2013/107548
PCT Pub. Date: Jul. 25, 2013

(65) Prior Publication Data
US 2015/0077562 A1  Mar. 19, 2015

(30) Foreign Application Priority Data
Jan. 19, 2012 (DE) .......................... 10 2012 200 731

(51) Int. Cl.
*B60R 1/00* (2006.01)
*G01S 17/93* (2006.01)
(Continued)

(52) U.S. Cl.
CPC ............... *B60R 1/00* (2013.01); *G01S 11/12* (2013.01); *G01S 17/936* (2013.01);
(Continued)

(58) Field of Classification Search
None
See application file for complete search history.

(56) References Cited

U.S. PATENT DOCUMENTS 6,919,917 B1 * 7/2005 Janssen ............... B60Q 9/005
348/143
2004/0105579 A1 6/2004 Ishii et al.
(Continued)

FOREIGN PATENT DOCUMENTS

| CN | 1902670 A | 1/2007 |
| DE | 10037129 A1 | 4/2001 |

(Continued)

OTHER PUBLICATIONS

International Search Report for PCT/EP2012/073835, dated Mar. 15, 2013.

*Primary Examiner* — William C Vaughn, Jr.
*Assistant Examiner* — Lindsay Uhl
(74) *Attorney, Agent, or Firm* — Norton Rose Fulbright US LLP; Gerard Messina

(57) ABSTRACT

A method for visualizing the surroundings of a vehicle, including the following steps: determining and storing an instantaneous distance between the vehicle and present obstacles in the surroundings of the vehicle with the aid of at least one sensor; determining and storing a present position of the vehicle; calculating an at least two-dimensional model of the surroundings from the stored data; calculating a virtual view of the model of the surroundings from a selected virtual observer position; recording a video depiction of at least a portion of the surroundings with the aid of at least one video camera and integrating the video depiction into the virtual view; and outputting the virtual view together with the integrated video depiction to a driver of the vehicle.

10 Claims, 3 Drawing Sheets

(51) Int. Cl.
*G01S 11/12* (2006.01)
*G06T 19/00* (2011.01)

(52) U.S. Cl.
CPC ...... *G06T 19/006* (2013.01); *B60R 2300/207* (2013.01); *B60R 2300/304* (2013.01); *B60R 2300/60* (2013.01); *B60R 2300/802* (2013.01); *B60R 2300/806* (2013.01); *B60R 2300/8086* (2013.01); *B60R 2300/8093* (2013.01)

(56) References Cited

U.S. PATENT DOCUMENTS

| 2011/0115913 | A1* | 5/2011 | Lang | B60K 35/00 |
|---|---|---|---|---|
| | | | | 348/148 |
| 2011/0188122 | A1* | 8/2011 | Habibi | B60R 1/08 |
| | | | | 359/604 |

FOREIGN PATENT DOCUMENTS

| DE | 102008036009 | 10/2009 | | |
|---|---|---|---|---|
| DE | 102009005505 | 10/2009 | | |
| DE | 102009005566 | 10/2009 | | |
| EP | 1179958 | 2/2002 | | |
| EP | 1291668 | 3/2003 | | |
| EP | 1462762 | 9/2004 | | |
| JP | 2001101405 A | 4/2001 | | |
| JP | EP 1179958 A1 * | 2/2002 | ............... | B60R 1/00 |
| WO | 2011030698 A1 | 3/2011 | | |
| WO | 2011158609 A1 | 12/2011 | | |

* cited by examiner

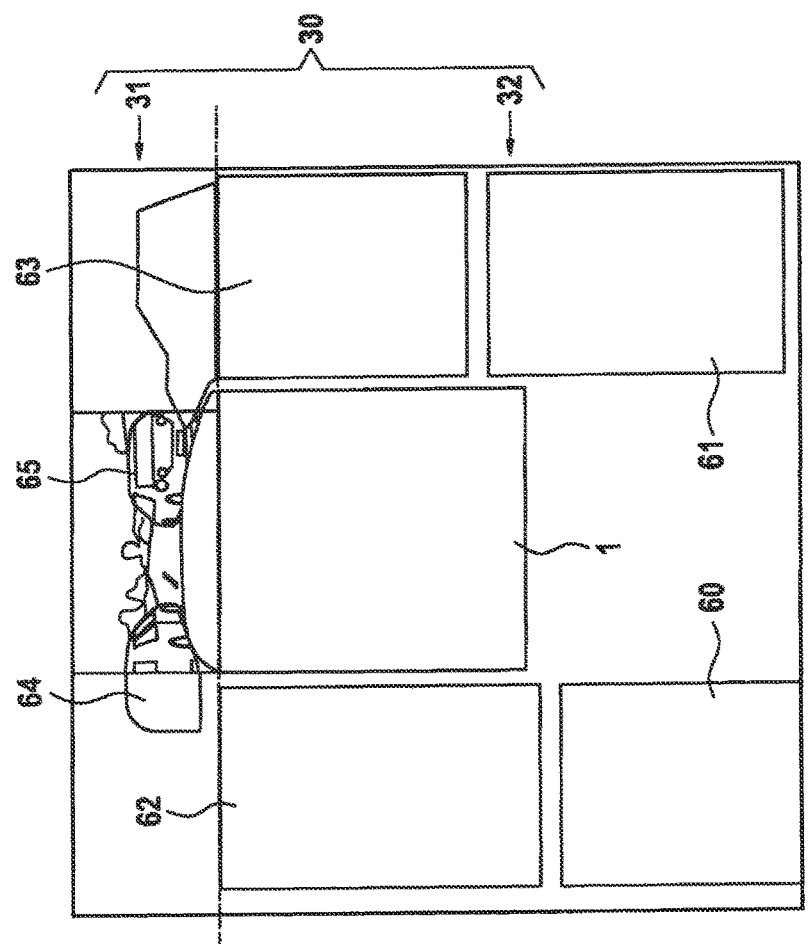
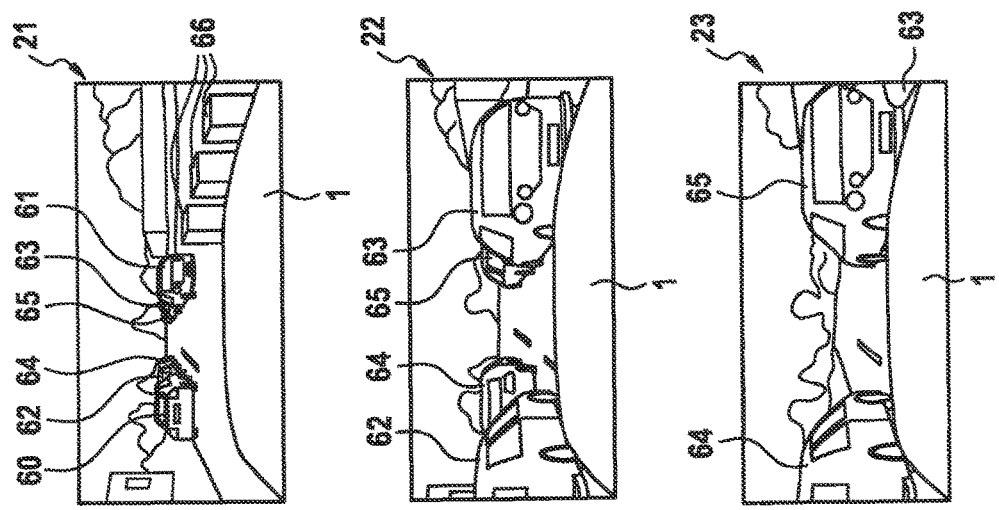
FIG. 5

METHOD AND DEVICE FOR VISUALIZING THE SURROUNDINGS OF A VEHICLE

FIELD OF THE INVENTION

The present invention relates to an enlarged display of the surroundings of a vehicle. In this concept referred to as augmented reality, location-related additional information is overlaid on the reality perceived by the observer. In a vehicle, this is generally implemented by a camera generating a real-time video image of the vehicle surroundings which is shown to the driver via an appropriate output device. This image then displays additional information to assist the driver. For example, this may be visualizing the anticipated roadway at the present steering angle or highlighting an obstacle. Such a system may be very useful in particular for narrow road sections or during parking maneuvers.

BACKGROUND INFORMATION

However, due to the limited aperture angle of the camera (typically smaller than 50°, the problem exists that only a limited area of the surroundings of the vehicle is visualizable. In particular, the close range of the vehicle is often not detectable using such a system. However, an accurate model of the surroundings of the vehicle in the close range is desirable to be able to communicate information to the driver also in this regard.

German Published Patent Appln. No. 10 2008 036 009 is known from the related art and describes a method for surveying the surroundings of a motor vehicle. With the aid of multiple sensors, which are not specified in greater detail, the close range of a vehicle is detected and a map of the surroundings, in which the vehicle is moving virtually, is generated from the obtained data. For visualization, it is proposed to display the generated area from a bird's eye view, for example. Moreover, important information may be visualized therein, such as imminent collisions or the display of the vehicle path. However, no visualization of the far range of the surroundings of the vehicle takes place.

German Published Patent Appln. No. 10 2009 005 566 describes a method for combining signals from a video camera with signals of close range sensors, such as ultrasonic sensors. For this purpose, objects in the surroundings of the vehicle, which may be surveyed using the close range sensors, are detected with the aid of the video camera. An object may thus be entered into a three-dimensional map of the surroundings of the vehicle. This map may then be used for various applications, for example, to assist the driver during parking. However, this document does not address the visualization in greater detail.

German Published Patent Appln. No. 10 2009 005 505 describes a method for generating an image of the surroundings of the vehicle from a virtual camera position, the image of a camera perspective being converted into the virtual camera position. For this purpose, the close range of the vehicle is detected using multiple cameras and is subsequently combined with a 3D model to smooth the perspective distortions of the camera. The 3D model is also obtained with the described cameras by resorting to the stereo-from-motion principle. This allows a video image to be shown to the driver of the entire close range of his vehicle, such as from a bird's eye view.

However, the described related art has the disadvantage that only the close range of the vehicle is visualized, while the far range is not considered. Moreover, as in the first two cases, the driver is not shown a video image of the surroundings. However, this is desirable since the image includes a lot of information and intuitively is easier for the driver to understand than a synthetic model. The third model, however, discloses the use of multiple cameras, which increases the manufacturing complexity and the costs of the vehicle. In addition, none of the cited publications discusses the option to advantageously use a continuous transition, in terms of the perspective, between artificially rendered models of the surroundings and image data of an optical surroundings sensor.

SUMMARY

The method according to the present invention for visualizing the vehicle surroundings meets the disadvantages of the related art. To depict comprehensive information of the surroundings for the driver in an intuitive and clearly laid out way, a split display is generated from the synthetically generated model of the surroundings and the real-time video image. To generate the model of the surroundings, an instantaneous distance between the vehicle and the obstacles in the surroundings is initially detected. At the same time, a present position of the vehicle is determined, which is stored temporarily together with the distance information. It is now possible to calculate a model of the surroundings of the vehicle from multiple stored position and distance data, which may be a two-dimensional or three-dimensional model, depending on the type of distance sensors used. The advantage of this model of the surroundings is that it is observable from different virtual positions. If a certain virtual observer position is established (by the driver, for example), a virtual view of the model of the surroundings is calculated from this observer position. It is possible this way to generate a top view of the surroundings, for example. In addition to the model of the surroundings, a portion of the surroundings is detected with the aid of at least one, preferably with the aid of exactly one, video camera. The video depiction thus generated is integrated into the virtual view in a suitable location, so that the driver may be shown a comprehensive image of the surroundings of his vehicle: In the detection area of the video camera, he sees a real-time video image of the surroundings, while he sees the synthetically generated model of the surroundings outside the detection area of the video camera. In addition to the video depiction of the surroundings, the driver thus also has information available about obstacles which are presently not located in the detection area of the video camera.

Using the method according to the present invention, overall a larger section of the surroundings is depictable than is detected by the video camera. It is thus also possible to use video sensors which have a small aperture angle. It is furthermore advantageous to use the generated three-dimensional model of the surroundings for smoothing perspective distortions.

The virtual view in particular includes a split depiction, according to which an artificial horizon is placed at the level of the transition between the engine compartment and the passenger compartment, which allows a breakdown into different views. For example, the artificial horizon may delimit the image of a forward camera from a synthetically generated bird's eye view.

The distance between the vehicle and obstacles is advantageously determined with the aid of optical sensors. These sensors may be either passive sensors (mono and stereo video) or active sensor systems (laser scanner, laser imager, photonic mixer device (PMD, optical sensor according to the time of flight method), Flash LIDAR).

It is furthermore advantageous if the distance data from obstacles in the surroundings of the vehicle are obtained from the signals of the video camera. This means that the video camera must fulfill two tasks. On the one hand, it serves as a distance sensor (e.g., according to the structure-from-motion method or by the video camera being a stereo camera), and on the other hand, it serves as a supplier of the video signal to be displayed. In addition to the video camera, thus no further sensor system is required to determine the model of the surroundings.

The position of the vehicle is preferably measured as an absolute position or as a position which is relative to a previously stored position. Odometry lends itself to determine a relative position, making the positioning process very simple. If an absolute position is to be measured, care must be taken that the positioning method is sufficiently precise. For example, a differential GPS may be used for this purpose.

In one further preferred specific embodiment, the virtual observer position of the model of the surroundings is established by the driver of the vehicle. This driver may thus individually design the visualization of the obstacles by varying the views and perspectives in the surroundings of the vehicle. As an alternative, the virtual observer position may be automatically established by an arithmetic unit and depicted on the display device. Finally, the virtual view of the model of the surroundings is calculated as a function of the selected virtual observer position, and the video depiction is adapted accordingly to insert the same seamlessly into the virtual view.

In addition, it is advantageous when instantaneous driving parameters are integrated into the virtual view. This may be, for example, the path to a parking lot or a looming collision object, it being irrelevant whether this object or the path is presently detected by the video camera. The visualization of the synthetic model of the surroundings also allows the driver to be warned with respect to objects outside the detection area of the video camera. Since the visualization of the model of the surroundings and the video depiction have a shared coordinate system, such additional information is also seamlessly superimposable on the two areas. For example, in this way a detected post may be "monitored" during a parking maneuver, even if the same has left the visible range of the camera.

The present invention additionally relates to a device for visualizing the vehicle surroundings. This device includes at least one sensor for determining a distance between the vehicle and obstacles and at least one sensor for determining a present position of the vehicle. Moreover, a memory device is present, in which the position data and distance data are stored. In addition, a video camera is used, which detects at least a portion of the surroundings and forwards these data to an arithmetic device. Based on the stored position data of the vehicle and distance data of the obstacles as well as the signals of the video camera, the arithmetic device generates a visualization of the surroundings, which is displayed to the driver on an output device. For this purpose, the arithmetic device calculates a model of the surroundings from the stored position and distance data. If a virtual observer position is selected, the arithmetic device furthermore determines a virtual view of this model of the surroundings from the selected virtual observer position. Finally, the arithmetic device integrates the signals of the video camera into the virtual view. The device according to the present invention is thus ideally suited for carrying out the method according to the present invention.

The at least one sensor for determining the distance between the vehicle and obstacles is advantageously either a passive optical sensor (mono and stereo video) or an active optical sensor system (laser scanner, laser imager, PMD, Flash LIDAR).

The sensor for determining a distance between the vehicle and obstacles preferably includes the video camera, which thus must fulfill two tasks. On the one hand, the camera supplies distance information from obstacles in the surroundings of the vehicle (e.g., according to the structure-from-motion method or the stereo video method), and on the other hand, it supplies the video signal to be displayed. As a result, no separate distance sensor system is required, which considerably simplifies the design of the device according to the present invention.

Moreover, a vehicle is disclosed, which includes a device according to the present invention or is configured in such a way that it carries out a method according to the present invention.

It is further advantageous if the video depiction recorded by the camera is processed for the display depiction. In this way, it may be adapted to the viewing angle from which the display depiction shows the virtual surroundings, so that no perspective distortions are created.

BRIEF DESCRIPTION OF THE DRAWINGS

FIG. 5 shows the visualization of the vehicle surroundings when driving through a narrow lane at a second point in time according to a second specific embodiment of the present invention.

DETAILED DESCRIPTION

Figure 1:
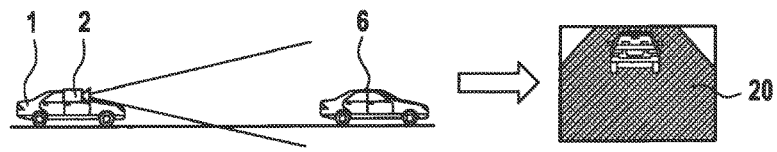
FIG. 1 shows an illustration of the visualization of the surroundings of a vehicle according to the related art.

FIG. 1 shows a customary, perspective video depiction 20 of surroundings detected by a camera 2 with a restricted viewing angle.

Figure 2:
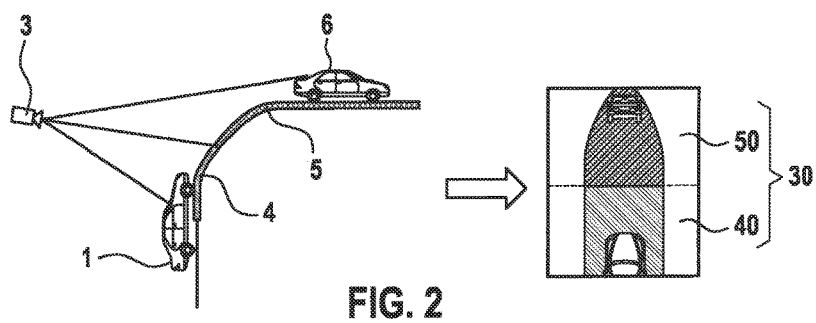
FIG. 2 shows an illustration of a first visualization variant of the surroundings of a vehicle according to a first specific embodiment of the present invention.
Figure 3:
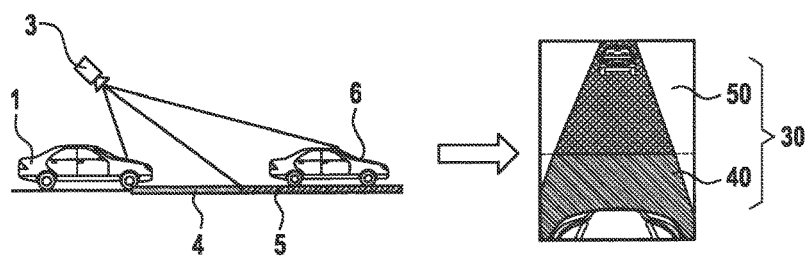
FIG. 3 shows an illustration of a second visualization variant of the surroundings of a vehicle according to a first specific embodiment of the present invention.

FIGS. 2 and 3 illustrate a first specific embodiment of the present invention. A vehicle 1 is considered, which is equipped with a camera 2. According to the present invention, the camera fulfills two functions: on the one hand, it is possible to display only a video depiction 20 of the surroundings; on the other hand, it is possible to determine the distance from obstacles 6 in the surroundings of the vehicle with the aid of the stereo-from-motion method. The camera thus also serves as a distance sensor, so that a three-dimensional model of the surroundings of the vehicle may be calculated. The model of the surroundings, in turn, allows a virtual observer position 3 (see FIGS. 2 and 3) to be established, from which the surroundings are to be observed. It is thus possible, for example, to generate a display depiction 30, which displays a continuous transition from a top view perspective (view perpendicularly from above) into the driver's perspective (see FIG. 2). Another option is the central perspective depiction of the close and far ranges from the bird's eye view (see FIG. 3). A first portion 40 of the display depiction is based on a reconstruction of the model of the surroundings. This corresponds to area 4 of the surroundings which is not visible to camera 2. A second portion 50 of the display depiction is based on the signals of the video camera. This corresponds to area 5 of the surroundings which is visible to the camera. In the two perspectives mentioned, video depiction 20 of the surroundings is appropriately transformed, so that it may be added seamlessly and without perspective distortion to the view calculated from the model of the surroundings.

Figure 4:
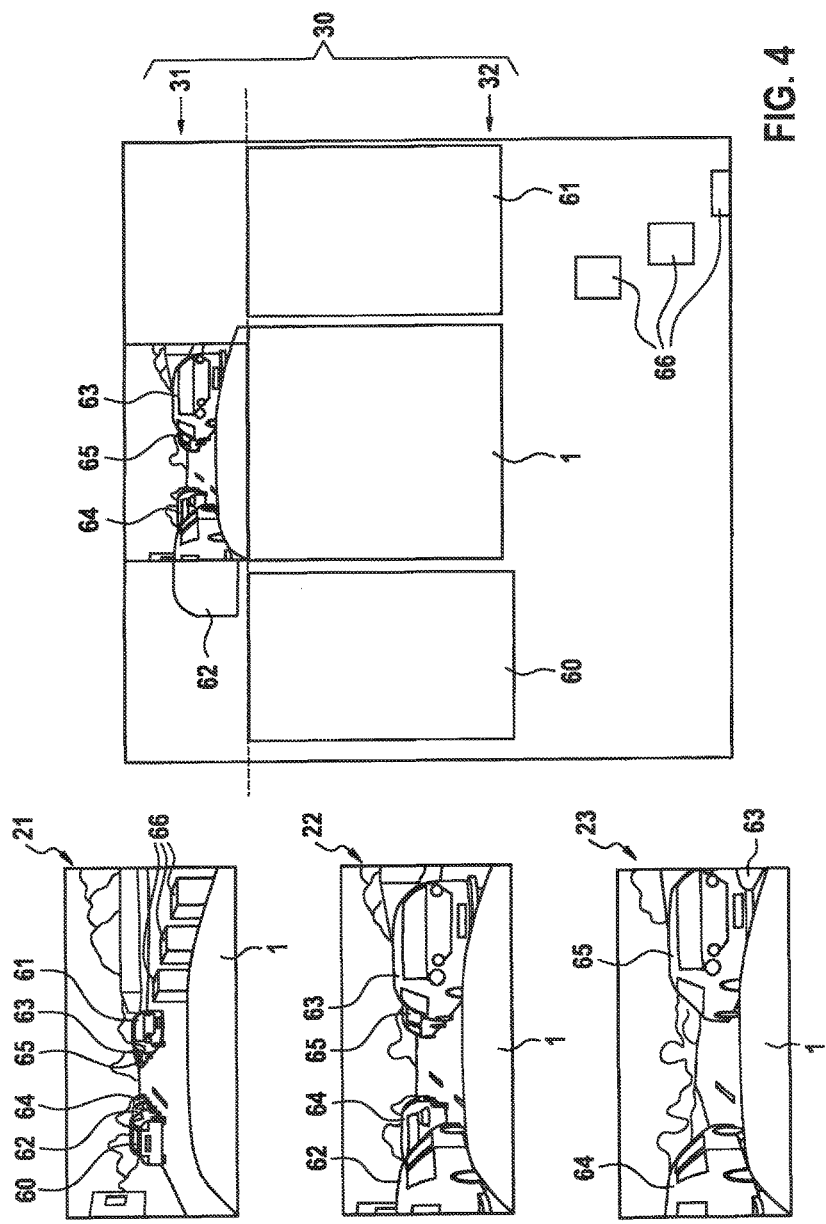
FIG. 4 shows the visualization of the vehicle surroundings when driving through a narrow lane at a first point in time according to a second specific embodiment of the present invention.

FIGS. 4 and 5 show a vehicle 1 driving through a narrow lane. This lane is formed by three vehicles 60, 62 and 64 on the left side, and by three vehicles 61, 63 and 65 on the right side, as well as by a few additional containers 66. As vehicle 1 drives through, the surroundings are visualized using the method according to the present invention according to a second specific embodiment. The entire process is described by way of example based on three images, a first image 21, a second image 22 and a third image 23, which were recorded by camera 2 at different points in time. Display depiction 30, which is shown to the driver, also has a split design here. Top area 31 shows a perspective as the driver also sees it. Here, the video depiction of camera 2 is integrated, which need not be transformed further for this purpose. Bottom area 32 shows the surroundings from the top view perspective. Top area 31 thus corresponds to the visualization of the far range of vehicle 1, while bottom area 32 corresponds to the visualization of the close range of the vehicle.

In FIG. 4, the vehicle is located in the position in which camera 2 records second image 22. At this location, rear left vehicle 60 and rear right vehicle 61 of the lane are no longer visible. However, according to the present invention, camera 2 is also used to determine a model of the surroundings using the stereo-from-motion principle, or is operated using a stereo video camera, so that the position of two vehicles 60 and 61 relative to the host vehicle 1 is known. It is therefore possible to ascertain without difficulty the position of two vehicles 60 and 61 with respect to the host vehicle from the model of the surroundings and to display this in display depiction 30 in bottom area 32 (top view perspective). The same applies analogously to containers 66 located behind the vehicle. These are still depicted, even though vehicle 1 has already passed the same. According to the present invention, it is nonetheless possible to warn the driver about these containers 66 since their position relative to the vehicle is known, although they have not been detected by video camera 2 for quite some time.

The video depiction of camera 2 is integrated into display depiction 30 in top area 31 (driver's perspective). This depiction is seamlessly inserted into the remaining display and may be expanded by additional surroundings information from the model of the surroundings. For example, vehicle 1 has already approached middle left vehicle 62 of the lane so far that the same is no longer completely detectable by camera 2. However, both the position of middle left vehicle 62 with respect to host vehicle 1 and its dimensions are known from the model of the surroundings. As a result, the video image shown in top area 31 of display depiction 30 may be expanded in that the contours of middle left vehicle 62 reconstructed from the model of the surroundings complete the video depiction.

FIG. 5 shows a second time step of driving through the lane, at which time camera 2 records third image 23. Objects which are no longer relevant, such as above-mentioned containers 66, are now no longer depicted. In addition, it is apparent based on middle right vehicle 63 how objects from top area 31 of display depiction 30 may switch to bottom area 32. Such a switch corresponds to the transition from the far range (driver's perspective or top area 31) into the close range (top view perspective or bottom area 32) and takes place at the point in time at which vehicle 1 passes the corresponding object. The continuous transition in the depiction finally results in a visualization of the surroundings of the driver's vehicle which is intuitively understandable for the driver of the vehicle.

What is claimed is:

1. A method for visualizing surroundings of a vehicle, comprising:
   determining and storing an instantaneous distance between the vehicle and present obstacles in the surroundings of the vehicle with the aid of at least one sensor;
   determining and storing a present position of the vehicle;
   calculating an at least two-dimensional model of the surroundings from the stored distance and position;
   calculating a virtual view of the model of the surroundings from a selected virtual observer position;
   recording a video depiction of at least a portion of the surroundings with the aid of at least one video camera and integrating the video depiction into the virtual view; and
   outputting the virtual view together with the integrated video depiction to a driver of the vehicle, wherein the virtual view includes a split depiction in which an artificial horizon, which is placed in particular at a level of a transition between an engine compartment and a passenger compartment of the vehicle, allows a breakdown into different views,
   wherein the output includes a continuous transition from a top view perspective into a driver's perspective,
   wherein a field of view of the integrated video depiction is expanded to include contours of the obstacles in the integrated video depiction by additional information that are obtained from the model of the surroundings.

2. The method as recited in claim 1, wherein the distance between the vehicle and the present obstacles is determined with the aid of at least one of a passive optical sensor and an active sensor system.

3. The method as recited in claim 1, wherein the distance between the vehicle and the present obstacles is determined by calculation from data of the video camera.

4. The method as recited in claim 1, wherein the present position of the vehicle is one of an absolute position and a position relative to a previously stored position.

5. The method as recited in claim 1, wherein the virtual observer position is established one of by the driver of the vehicle and automatically by an arithmetic unit.

6. The method as recited in claim 1, wherein instantaneous driving parameters are integrated into the virtual view.

7. A device for visualizing surroundings of a vehicle, comprising:
   at least once sensor producing a sensor signal for determining a distance between the vehicle and obstacles in the surroundings of the vehicle;
   at least one sensor producing a sensor signal for determining a present position of the vehicle;
   a memory device for storing the sensor signals;
   a video camera recording at least a portion of the surroundings; and a processing device communicatively coupled to the memory device, wherein the processing device is configured:
    to calculate an at least two-dimensional model of the surroundings from the sensor signals of the memory device,
    to calculate a virtual view of the model of the surroundings from a selected virtual observer position, and
    to integrate a video depiction of the surroundings recorded by the video camera into the virtual view; and
an output device for visualizing the virtual view with the integrated video depiction, wherein the virtual view includes a split depiction in which an artificial horizon, which is placed in particular at a level of a transition between an engine compartment and a passenger compartment of the vehicle, allows a breakdown into different views,
wherein the output includes a continuous transition from a top view perspective into a driver's perspective,
wherein a field of view of the integrated video depiction is expanded to include contours of the obstacles in the integrated video depiction by additional information that are obtained from the model of the surroundings.

8. The device as recited in claim 7, wherein the at least one sensor for determining the distance between the vehicle and the present obstacles includes at least one of a passive optical sensor and an active sensor system.

9. The device as recited in claim 7, wherein the at least one sensor for determining the distance between the vehicle and the present obstacles includes the video camera.

10. A vehicle, comprising:
    a device for visualizing the surroundings of a vehicle, comprising:
        at least once sensor producing a sensor signal for determining a distance between the vehicle and obstacles in the surroundings of the vehicle;
        at least one sensor producing a sensor signal for determining a present position of the vehicle;
        a memory device for storing the sensor signals;
        a video camera recording at least a portion of the surroundings; and
        a processing device communicatively coupled to the memory device, wherein the processing device is configured:
            to calculate an at least two-dimensional model of the surroundings from the sensor signals of the memory device,
            to calculate a virtual view of the model of the surroundings from a selected virtual observer position, and
            to integrate a video depiction of the surroundings recorded by the video camera into the virtual view; and
        an output device for visualizing the virtual view with the integrated video depiction, wherein the virtual view includes a split depiction in which an artificial horizon, which is placed in particular at a level of a transition between an engine compartment and a passenger compartment of the vehicle, allows a breakdown into different views,
    wherein the output includes a continuous transition from a top view perspective into a driver's perspective,
    wherein a field of view of the integrated video depiction is expanded to include contours of the obstacles in the integrated video depiction by additional information that are obtained from the model of the surroundings.

* * * * *